Figure 1:
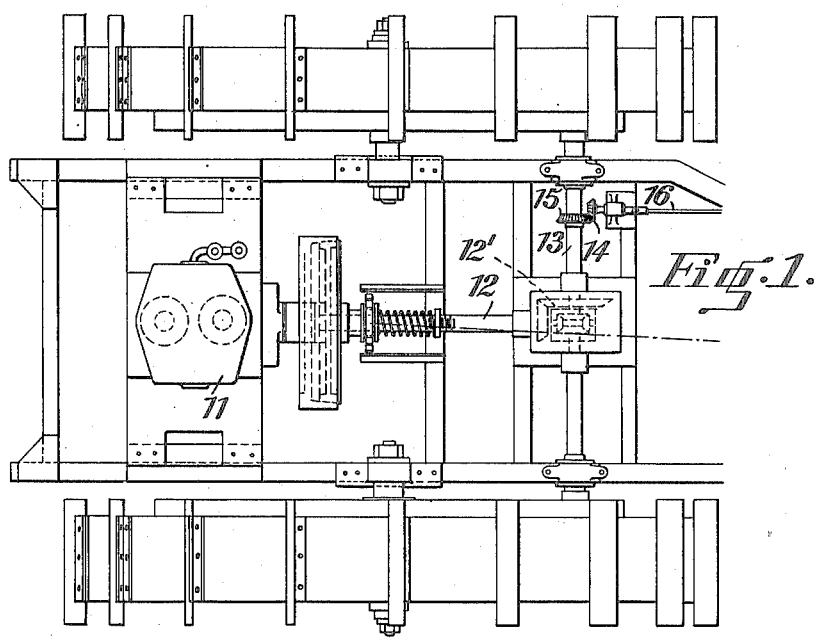
Figure 1A:
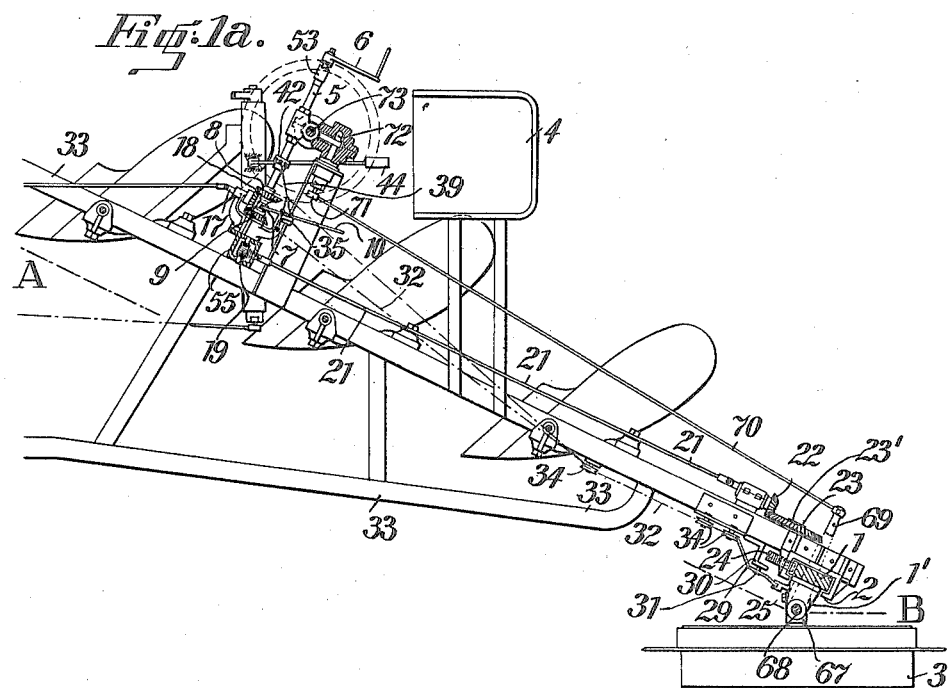

C. GLEICHE.
DEVICE FOR THE VERTICAL ADJUSTMENT OF THE FRAME OF A MOTOR PLOW RELATIVELY TO THE STEERING WHEEL.
APPLICATION FILED JUNE 19, 1914.

1,284,089.

Patented Nov. 5, 1918.

4 SHEETS—SHEET 1.

Witnesses:
Charles A. Mathé
Arthur J. Gagnon

Inventor:
Carl Gleiche
by John Lotka
Attorney

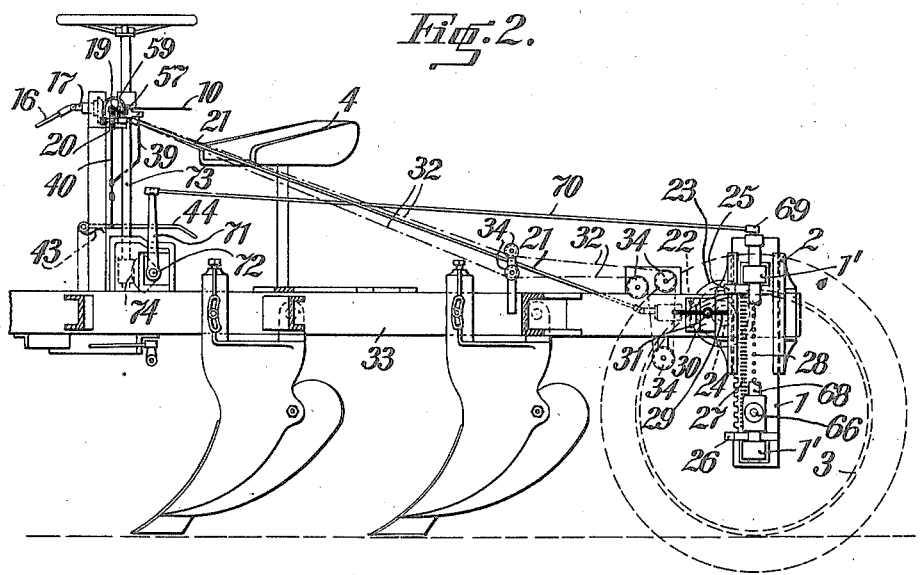
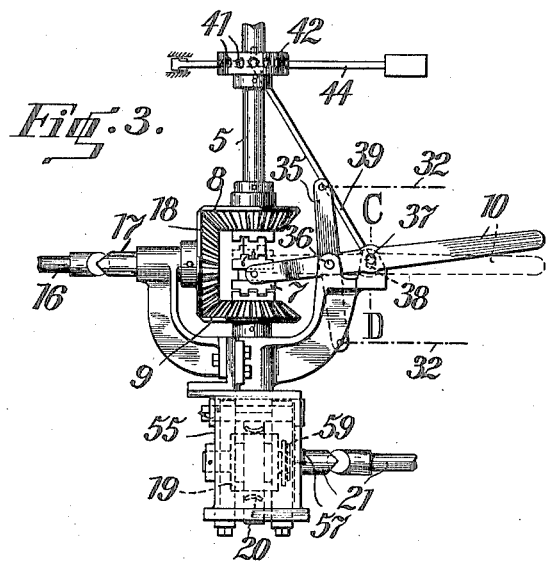

C. GLEICHE.
DEVICE FOR THE VERTICAL ADJUSTMENT OF THE FRAME OF A MOTOR PLOW RELATIVELY TO THE STEERING WHEEL.
APPLICATION FILED JUNE 19, 1914.
1,284,089.
Patented Nov. 5, 1918.
4 SHEETS—SHEET 3.
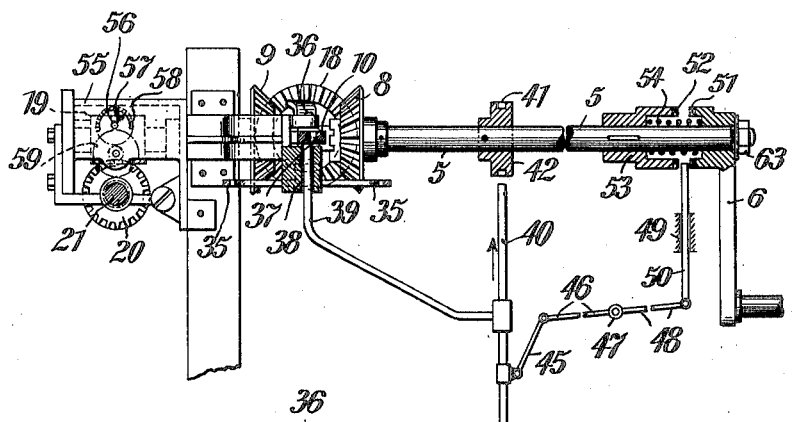
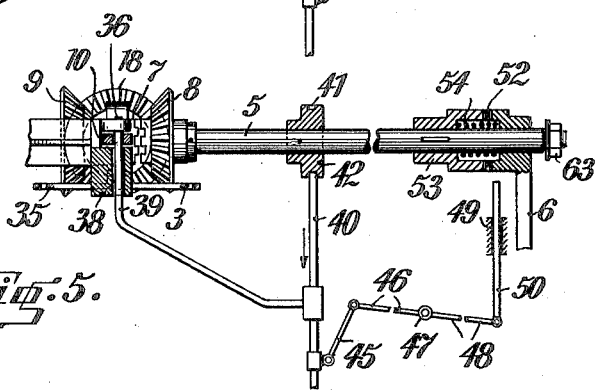
Witnesses:
Charles A. Math
Arthur J. Gagnon
Inventor:
Carl Gleiche
by John Lotka
Attorney:

C. GLEICHE.
DEVICE FOR THE VERTICAL ADJUSTMENT OF THE FRAME OF A MOTOR PLOW RELATIVELY TO THE STEERING WHEEL.
APPLICATION FILED JUNE 19, 1914.

1,284,089.

Patented Nov. 5, 1918.
4 SHEETS—SHEET 4.

Witnesses:
Charles A. Mathé
Arthur J. Gagnon

Inventor:
Carl Gleiche
by John Locke
Attorney:

UNITED STATES PATENT OFFICE.

CARL GLEICHE, OF BERLIN, GERMANY, ASSIGNOR TO STOCK MOTORPFLUG GESELL-SCHAFT MIT BESCHRÄNKTER HAFTUNG, OF BERLIN, GERMANY, A CORPORATION OF GERMANY.

DEVICE FOR THE VERTICAL ADJUSTMENT OF THE FRAME OF A MOTOR-PLOW RELATIVELY TO THE STEERING-WHEEL.

1,284,089.   Specification of Letters Patent.   Patented Nov. 5, 1918.

Application filed June 19, 1914. Serial No. 846,040.

*To all whom it may concern:*

Be it known that I, CARL GLEICHE, a citizen of the German Empire, and resident of Berlin, Germany, have invented certain new and useful Improvements in Devices for the Vertical Adjustment of the Frame of a Motor-Plow Relatively to the Steering-Wheel, of which the following is a specification.

In order to regulate the depth to which the shares or other soil-working elements of an agricultural machine will enter the ground, various devices have been proposed for raising and lowering the frame carrying such elements, relatively to the supporting wheels of the vehicle, and particularly with reference to the directing or steering wheel of a motor plow. According to my present invention, stops are provided which will cause the adjusting device to be thrown out of action automatically at the limits of the intended travel of said device; the adjusting device is thrown into action by the operator. This automatic control of the adjusting device is of particular value in cases where such adjusting device is power-driven (instead of being driven by the operator); with a power-driven adjusting device, the operator simply throws in and out at the proper time, the clutch or other device which connects the motor with the adjusting device, and if he does not watch the operation carefully, it may occur that the adjusting device will be allowed to remain in action too long. If for instance the adjusting device comprises a rack and a pinion, then, in case the operator is careless, the pinion may be carried beyond the end of the rack, or (if the rack teeth are formed by cutting a bar the ends of which retain the full width) the pinion may be brought in engagement with the wide end portion of the rack and have its teeth broken by contact with such end portion.

The defect pointed out above is avoided, according to my invention, by providing stops or equivalent devices which will arrest the operation of the adjusting gear or device before it can run beyond the proper limits. Such stops may be located at various points of the raising and lowering device. A particularly suitable location, however, is upon the frame or support carrying the directing or steering wheel of the vehicle, since with this arrangement the stops are readily visible and accessible, easily applied, and conveniently fastened according to the desired limits of the movement of the adjusting device. I may also make these stops adjustable, so that the exact point at which the adjusting device will be thrown out of action may be varied, yet after each vertical adjustment of the vehicle frame relatively to the steering wheel, the plow shares or other soil-working devices will enter the ground to the same depth, as long as the adjustment of the stops remains unaltered.

Figure 6:
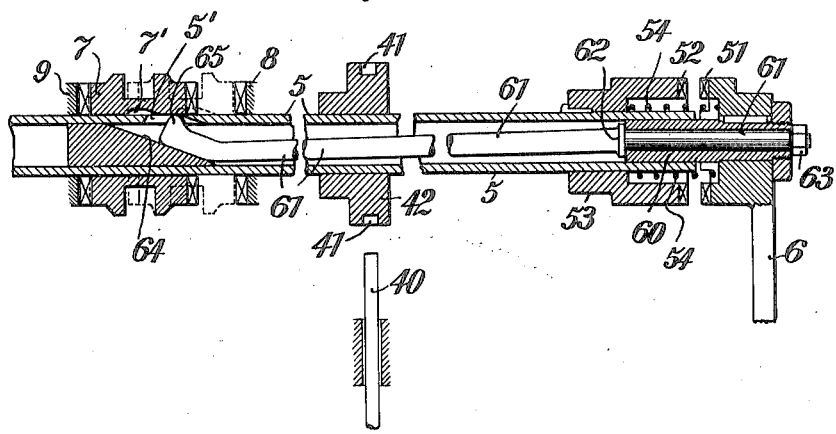
Figure 7:
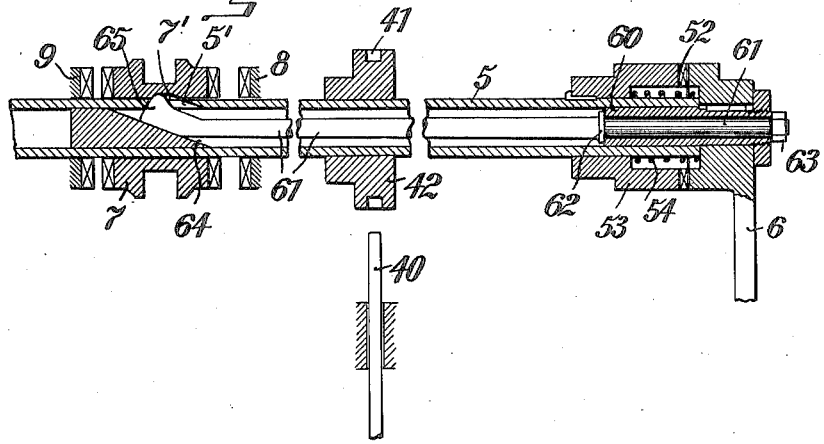

A specific example of my invention is shown in the accompanying drawings, in which Figure 1 is a plan view of a portion of a motor plow embodying my invention; Fig. 1ª is the right-hand continuation of Fig. 1; Fig. 2 is a vertical section of a portion of the plow, taken on line A—B of Fig. 1ª; Fig. 3 is a plan view, on an enlarged scale, of the clutch mechanism and adjacent parts; Fig. 4 is an elevation of the clutch mechanism and adjacent parts, partly in section on line C—D of Fig. 3; Fig. 5 is a view similar to Fig. 4, but showing the parts in a different position; Figs. 6 and 7 are vertical sections, drawn upon a still larger scale, of another form of locking device used in connection with my invention, showing said device in two positions.

The rack 1, in which the steering wheel 3 is journaled, is mounted to slide up or down in a guide 2 secured to the plow frame 33. Two devices are provided for adjusting the frame 33 up or down relatively to said steering wheel 3: A device, operated entirely by hand, comprises a crank 6 carried by a shaft 5 and within easy reach of the operator seated on the seat 4. Another device, more fully described hereinafter, connects the shaft with the motor 11 of the plow, said connection being controlled by a lever 10, located within the operator's reach and adapted to shift a clutch sleeve 7, held to turn with the shaft 5, into engagement with clutch teeth formed on the adjacent faces of two bevel wheels 8 and 9 respectively which rotate in opposite directions, being in engagement with a bevel wheel 18, driven by the motor 11 as follows: The motor shaft 12 is connected by gearing 12' with a countershaft 13, which, by means of bevel gearing 15, 14, transmits its rotation to the connected shafts 16, 17, the latter carrying the above-mentioned bevel wheel 18. Of course, the bevel wheels 8 and 9 are mounted on the shaft 5 loosely, and are held against longitudinal movement in any suitable manner.

Whether the shaft 5 is turned by hand, by operating the crank 6 (the clutch sleeve 7 being in the central, disengaged position), or whether said shaft is rotated by the motor 11, after the operator has thrown the clutch sleeve 7 to one side or the other (for raising or lowering respectively), the rotation of the shaft 5 will adjust the frame 33 up or down, by means of the following mechanism: A worm 19, secured to the shaft 5, meshes with a worm wheel 20 connected with a shaft 21 which extends toward the steering wheel 3 and, by means of bevel gearing 22, 23 (Fig. 1ª), drives a short horizontal cross shaft 23' journaled in the frame 33 and carrying a pinion 24 in mesh with the rack 1.

According to the form of my invention illustrated, the rack 1 in which the steering wheel 3 is journaled, (or rather with which the steering wheel is connected, in the manner described below), carries two stops 25 and 26 respectively, each adjustable to fit any one of a vertical series of holes 28, a scale 27 being preferably provided on the rack to guide the operator in adjusting said stops. The stops 25, 26 lie in the path of the rear end of a lever 29, pivoted to swing about a horizontal axis 31, upon a bracket 30 rigidly secured to the plow frame 33. The forward end of the lever 29 is connected by means of a wire cable or other tension member 32, guided by pulleys 34 journaled on the plow frame 33, with the two arms of a lever 35 which is secured rigidly to the clutch lever 10, as by being fastened to the trunnions or axle 36 of said lever 10.

The lever 10 is provided with an aperture 37 which in the central or idle position of the clutch lever (indicated by dotted lines in Fig. 3) registers with a slot or guide 38 for one end of a vertically movable rod 39, which end may enter the aperture 37 of the lever 10, to lock the latter, see Fig. 5. The rod 39 is connected rigidly with another rod 40, the upper end of which is adapted to enter recesses or sockets 41 provided on the periphery of a disk 42 secured rigidly to the shaft 5. The rod 40 is connected, at its lower end, (see Fig. 2) with a treadle 44 adapted to be actuated by the operator, said treadle and the rods 40, 39 being normally pressed upward by a spring 43.

To the rod 40 is connected pivotally a link 45 having a like connection with one arm 46 of a lever fulcrumed at 47 upon the plow frame 33. The other arm 48 of said lever has a loose pivotal connection with a vertical rod 50 movable in a guide 49 provided on the plow frame 33. The upper end of the rod 50 coöperates, in the manner described below, with the hand crank 6, which is mounted loosely on the shaft 5 and is provided with a sleeve or hub having clutch teeth 51 adapted to engage clutch teeth 52 on a sleeve 53 rigidly secured to the shaft 5. Within the two sleeves is arranged a spring 54 tending to hold the crank 6 in the disconnected position shown in Fig. 4.

In the casing 55 containing the worm 19 there is journaled a shaft 56 (Fig. 4) carrying a hand 57 indicating on a dial or scale 58 provided on the casing 55; this shaft 56 is rotated from the shaft 21, say by means of toothed gearing 59 located in the casing 55.

While plowing, the rods 40, 39, which form a double locking bolt, generally hold the shaft 5 against rotation and lock the clutch lever 10 in the releasing or neutral position. (Fig. 5). Under these circumstances, it is indeed possible to bring the hand crank 6 into clutch engagement with the sleeve 53, by overcoming the resistance of the spring 54, but even then it will be impossible to turn the shaft 5, since the latter is locked by the engagement of the rod 40 with one of the recesses 41 in the periphery of the disk 42. If the operator desires to raise or lower the frame 33, relatively to the steering wheel 3, by an exclusively manual operation, he will first press down the treadle 44, but not enough to cause the upper end of the rod 39 to leave the aperture 37 of the clutch lever 10; the rod 40 however, is by this partial depression of the treadle 44, removed from contact with the disk 42. At the same time, the connection comprising the link 45 and lever 46, 48 causes the rod 50 to be raised, but not enough to bring it between the clutch teeth 51, 52. It is now possible, by shifting the crank 6 to the clutched position shown in Fig. 5, and then turning said crank, to rotate the shaft 5, since the latter is now released from the locking rod or bolt 40. The rotation of the shaft 5 is transmitted by the gearing 19, 20, shaft 21, gearing 22, 23, and shaft 23', to the pinion 24, so that the plow frame 33 will be raised or lowered (according to the direction in which the shaft 5 is rotated) relatively to the steering wheel 3, the extent of this vertical adjustment depending, of course, on the number of turns given to the shaft 5. While the shaft 5 is thus being turned manually, the clutch lever 10 remains locked in its disengaged or neutral position, so that there is no danger of accidentally shifting the lever 10 and throwing in the power connection for shaft 5 while the latter is being turned manually by the operator. Of course, serious injury to the driver might follow if the power connection of shaft 5 should accidentally be established while he is holding the crank 6 and turning the shaft 5 by means of said crank.

When it is desired to adjust the plow frame 33 up or down by power and not manually, the treadle 44 is depressed fully, so as to cause the upper end of the rod 39 to be withdrawn from the aperture 37 in the clutch lever 10 (Fig. 4). At the same time the rod 50 is raised to a higher position than in the operation described above, so that the upper end of said rod, which end is preferably forked, will come between the teeth 51 and 52, thereby locking the crank 6 against movement lengthwise of the shaft 5, so that said crank cannot be brought into clutch engagement with said shaft. I thus avoid all danger of injury to the driver, such as would be liable to result if, at the time the shaft 5 is being rotated by the power mechanism, he could bring the crank 6 into clutch engagement with said shaft.

After the clutch lever 10 has been released as described, it can be swung to one side or the other to bring the clutch sleeve 7 into engagement with one or the other of the driving wheels 8 and 9 which rotate in opposite directions. The shaft 5 will then be power-driven in one direction or the other, and its rotation will be transmitted to the pinion 24 in the same manner as when the shaft is rotated by the manual operation of the crank 6; the desired vertical adjustment of the plow frame 33 relatively to the steering wheel 3 may thus be obtained with the aid of power derived from the motor 11.

Whether the pinion 24 be rotated by the manual operation of the crank 6, or by power derived from the motor 11, if the motion of the plow frame 33 relatively to the rack 1 carrying the steering wheel 3 should be of such extent as to bring the rear end of the lever 29 into engagement with one or the other of the stops 25, 26, this lever will be caused to swing on its axis 31, thereby causing the lever 35 and the clutch lever 10 to be swung on their axis 36, through the action of the wire cable or pulling member 32. The clutch sleeve 7 is thus shifted into the central or neutral position, so that the power mechanism cannot adjust the plow frame 33 beyond the safety limits, that is to say, a sufficient distance to cause breakage or disengagement of the pinion 24. As the clutch lever 10 swings to its central position, its aperture 37 again comes in registry with the slot or guide 38, and (since the treadle 44 has been released by the driver) the spring 43 will cause the rods or locking bolts 39, 40 to enter again the aperture 37 and one of the recesses 41 respectively, thus locking the clutch lever in its neutral position, and also locking the shaft 5 against rotation, so that said shaft cannot be operated manually either. At the same time, the locking rod 50 is brought from the locking position shown in Fig. 4 to the released position shown in Fig. 5. Still, for the reasons explained above, while it is now possible to turn the crank 6 alone, it is not possible to turn said crank with the shaft 5, since the latter is locked by the rod or bolt 40. If, when depressing the treadle 44, the shaft 5 is released from its locking bolt or rod 40 before the clutch lever 10 is released from its locking bolt 39, then upon the operation of the lever 29, the clutch lever 10 will be locked before the shaft 5. In any event, whether the shaft 5 is actuated manually or by the power of the motor 11, the arrangement described above insures absolute safety against breakages of the adjusting mechanism, which breakages might be caused by carrying the pinion 24 too far on the rack 1, or by continuing to apply the power of the motor 11 to the shaft 5 after the latter has been locked against rotation; in other words, the improved mechanism also prevents a premature locking of the shaft 5 against rotation.

For the sake of completeness, I will give a brief description of the steering mechanism shown in the drawings, although such mechanism forms no part of my present invention: The steering wheel 3 is mounted to turn on a horizontal stub axle 66 carried by a knuckle 67 which by means of a vertical shaft 68 rigid with said knuckle, is mounted to swing on brackets 1' rigid with the rack 1. The shaft 68 has no endwise movement relatively to the rack 1. The rack 1 with its brackets 1', the shaft 68, knuckle 67, and stub axle 66, together form a carrier for the steering wheel 3. The upper end of said shaft 68 carries a crank arm 69, from which an operating rod 70 extends forward to an arm 71 on a shaft 72 which is operated from the steering shaft 73 in any suitable manner, as by means of the customary worm and wheel connection indicated at 74.

The dial or scale 27 may be omitted when the holes 28 are arranged at predetermined intervals, but facilitates the exact vertical adjustment of the frame 33 and of the plow shares or other soil-working devices carried thereby, so that said devices will penetrate to the desired depth. It will be obvious that the depth to which the plow shares enter the soil, will depend on the adjustment of the stops 25, 26 on the rack 1 carrying the steering wheel 3. Thus, after raising the plow shares to their inoperative position, they will always be lowered to the same operative position, as long as the adjustment of the stops 25, 26 is not altered. All that the driver has to do to lower the shares to the operative position, or to raise them to the inoperative position, is to depress the treadle 44 fully and to swing the clutch lever 10 in one direction or the other. In this case, the power of the motor will be utilized to effect the adjustment of the plow frame 33 and of the shares carried thereby. If the driver prefers to work the shaft 5 by hand, he will depress the treadle 44 only partially and then connect the crank 6 with said shaft in the manner described above. It will also be observed that my improved mechanism provides a safeguard against an accidental alteration of the furrow depth during the plowing operation, say by an accidental shifting of the lever 10 while the machine is plowing, since the moment the clutch sleeve 7 is thrown into the neutral position, not only the shaft 5, but the lever 10 is locked positively, by the rods or bolts 40 and 39 respectively.

There is an operative connection between the scale 27 or rather the pinion 24, and the dial 58 or rather the hand 57, by means of the shaft 56, gearing 59, shaft 21, gearing 22, 23, and shaft 23'. The driver, by looking at the scale 58 which is in front of him, can thus see whether the device is operating properly, that is, whether the stops 25, 26 really arrest the adjusting device at the desired points. If for instance the tension member 32 should break or become slack, the apparatus would cease to work properly, and this would be indicated to the driver by the fact that the hand 57 would travel beyond the points on the scale 58 which correspond to the location of the stops 25, 26. It will be understood that the scale 58 is graduated in such a manner that the hand 57 will indicate at all times, the position of the pinion 24 relatively to the rack 1. In case of the device becoming inoperative as mentioned above, the driver would at once disconnect the clutch sleeve 7 by throwing the lever 10 to the neutral position, thus stopping the operation of the adjusting device. Of course, the driver can in the same manner arrest the adjusting device at any time before the stop 25 or 26 arrests it automatically, for instance if at any particular place it should be desired to have the furrow of less depth than corresponds to the adjustment of the stop 26.

In Figs. 6 and 7 I have shown another construction for the independent locking of the devices for the manual and the motor-actuated operation of the adjusting mechanism. The shaft 5 as before carries a disk 42 provided with peripheral holes or recesses 41 adapted to receive the end of the locking rod or bolt 40, which, if desired, may be combined with another rod or bolt 39, in the same manner as shown in Figs. 4 and 5, or, as shown in Figs. 6 and 7, the rod 40 may be used without any rod 39. The shaft 5 is tubular and at its right-hand end contains a sleeve 60 keyed to the hand crank 6. The sleeve 60 is mounted to turn on a rod 61 contained in the shaft 5, while a collar 62 and a nut 63 serve to prevent any movement of the sleeve 60 lengthwise of the rod 61. The latter, at its left-hand end, engages an inclined surface 64 rigid with the shaft 5, and this end of the rod 61 has a lug 65 extending into, and in a certain position through, a slot 5' provided in the hollow shaft 5. The clutch sleeve 7 secured to the shaft 5 in such a manner as to rotate therewith, while free to slide lengthwise on the shaft, has a recess 7' adapted to register with the slot 5' when the clutch sleeve 7 is in the central or neutral position (Fig. 7). In Fig. 6, the solid lines indicate the position in which the clutch sleeve 7 engages the clutch teeth of the left-hand bevel wheel 9, while the dotted lines indicate the position in which the said clutch sleeve is in engagement with the clutch teeth on the right-hand bevel wheel 8. It will be obvious from Figs. 6 and 7 that the lug 65 of the rod 61 can enter the recess 7' only when the clutch sleeve 7 is in the neutral position, but when the said sleeve is in either of the engaged or operative positions, the inner wall of the sleeve (as shown in Fig. 6) forms a stop preventing the outward movement of the lug 65, and since the wedge action of the inclined surface 64 will tend to move the lug 65 outwardly when the rod 61 is shifted toward the left, it follows that when the clutch sleeve 7 is in either of the engaged positions, it locks the rod 61 against longitudinal movement to the left. Since the hand crank 6, keyed to the sleeve 60, is compelled to carry the rod 61 with it when moved lengthwise, it follows that the crank 6 can be moved toward the left only when the clutch sleeve 7 is in the neutral position shown in Fig. 7. This movement of the crank 6 causes the lug 65 to ride up the incline 64 and to come into locking engagement with the walls of the recess 7', and at the same time, the movement of the crank 6 toward the left couples said crank with the shaft 5, by the action of the clutch teeth 51, 52, in the same manner as in the form of my invention first described. It will be seen that when the shaft 5 is in operative connection with the motor, through the engagement of the clutch sleeve 7 with one or the other of the driving wheels 8, 9, it is impossible for the driver to throw the hand crank 6 into driving connection with the shaft 5; similarly, when the hand crank 6 is in operative connection with the shaft 5 (Fig. 7), it is impossible to throw the motor into driving connection with the shaft 5, because the clutch sleeve 7 is locked in its neutral position by the lug 65 of the rod 61. I thus avoid, as in the form of my invention first described, all possibility of injury to the driver through a simultaneous coupling of the shaft 5 with the hand crank 6 and with the motor-driven wheel 8 or 9.

Various modifications may be made without departing from the nature of my invention as set forth in the appended claims.

I claim as my invention:

1. In a motor plow, the combination of a steering wheel, a carrier therefor, a plow share frame adjustable up and down relatively to said steering wheel carrier, a device for adjusting said frame relatively to the steering wheel carrier, stops on said carrier, a member carried by said frame and movable relatively thereto, said member being adapted to be brought into engagement with said stops by the adjusting movement of the frame, and to be moved relatively to the frame by the continued movement of such frame after such engagement has taken place, and mechanism, operated by the movement of said member relatively to the frame, for throwing said adjusting device out of action.

2. In a motor plow, the combination of a steering wheel, a carrier therefor, a plow share frame adjustable up and down relatively to said steering wheel carrier, a device for adjusting said frame relatively to the steering wheel carrier, stops on said carrier, means carried by said frame and adapted to be brought into engagement with said stops by the adjusting movement of the frame, and mechanism thrown into action by the engagement of said stops with said means, for throwing the said adjusting device out of action.

3. In a motor plow, a steering wheel, a carrier therefor, a plow share frame adjustable up and down relatively to said steering wheel carrier, a device for adjusting said frame relatively to said steering wheel carrier, stops on said carrier, means carried by said frame and adapted to be brought into engagement with said stops by the adjusting movement of the frame, mechanism thrown into action by the engagement of said stops with said means, for throwing the said adjusting device out of action, and manually-actuated means for throwing said device out of action.

4. In a motor plow, the combination of a steering wheel, a plow share frame adjustable up and down relatively to said steering wheel, a device for adjusting said frame relatively to the steering wheel, a carrier for said steering wheel, the frame being adjustable up and down in relation to said carrier also, stops on said carrier, means carried by said frame and adapted to be brought into engagement with said stops by the adjusting movement of the frame, and mechanism thrown into action by the engagement of said stops with said means, for throwing the said adjusting device out of action.

5. In a motor plow, the combination of a steering wheel, a carrier for said steering wheel, a plow share frame adjustable up and down relatively to said carrier, a device for adjusting said frame relatively to the carrier, stops mounted on said carrier and adjustable to different levels, means carried by said frame and adapted to be brought into engagement with said stops by the adjusting movement of the frame, and mechanism thrown into action by the engagement of said stops with said means, for throwing the said adjusting device out of action.

6. In a motor plow, the combination of a steering wheel, a plow share frame adjustable up and down relatively to said steering wheel, a device for adjusting said frame relatively to the steering wheel, an indicator movable on said frame and located adjacent to the driver's seat so as to be readily visible to the driver, and an operative connection between said indicator and the adjusting device, said connection being such that each position of said indicator will correspond to a single position of the adjustable frame.

7. In a motor plow, the combination of a steering wheel, a plow share frame adjustable up and down relatively to said steering wheel, a device for adjusting said frame relatively to the steering wheel, a connection between the motor of the plow and said adjusting device, a movable member controlling said connection, and a double locking mechanism for locking said movable member and also the adjusting device itself.

8. In a motor plow, the combination of a steering wheel, a plow share frame adjustable up and down relatively to said steering wheel, a device for adjusting said frame relatively to the steering wheel, a connection between the motor of the plow and said adjusting device, a movable member controlling said connection, and a double locking mechanism one element of which is adapted to lock said movable controlling member, while the other element of the locking mechanism is adapted to lock the adjusting device itself, the two elements of the locking mechanism, and the parts coöperating therewith, being so arranged that during the movement which releases said controlling member, preparatory to throwing the adjusting device into action, the locking mechanism will release first the adjusting device itself and then the controlling member, while during the locking movement which follows the throwing out of action of the adjusting device, the locking mechanism will first lock the said controlling member and then the adjusting device itself.

9. In a motor plow, the combination of a steering wheel, a plow share frame adjustable up and down relatively to said steering wheel, a device for adjusting said frame relatively to the steering wheel, a driving connection between the motor of the plow and said adjusting device, a movable member controlling said connection, a double mechanism for locking said controlling member and also the adjusting device itself, a hand crank adapted to be thrown into and out of driving connection with said adjusting device, and a locking member connected with said locking mechanism and adapted to lock said hand crank in its inactive position at the time the said controlling member is released.

10. In a motor plow, the combination of a steering wheel, a plow share frame adjustable up and down relatively to said steering wheel, a device for adjusting said frame relatively to the steering wheel, a driving connection between the motor of the plow and said adjusting device, a movable member controlling said connection, mechanism for locking the said controlling member, a hand crank adapted to be thrown into and out of driving connection with said adjusting device, and means, operated by the movement of the hand crank to its driving position, for bringing said locking mechanism to the position in which it holds said controlling member in its neutral or inactive position.

11. In a motor plow, the combination of a steering wheel, a plow share frame adjustable up and down relatively to said steering wheel, a device for adjusting said frame relatively to the steering wheel, said device comprising a hollow shaft operatively connected with the movable frame, a clutch sleeve slidable on said shaft and held to rotate therewith, driving means operated by the motor of the plow and adapted for operative connection with said clutch sleeve, the latter being provided with a recess adapted to register with a slot in the shaft, at the time the sleeve is in the neutral or releasing position, a hand crank mounted on said shaft loosely, but adapted to be brought into driving connection with the shaft by moving the crank lengthwise of the shaft, and a rod connected with said crank to move lengthwise therewith, said rod having a locking lug adapted to project through the slot of the shaft into the recess of the clutch sleeve to lock the latter in its neutral position, the clutch sleeve, when in its active position, holding and locking the said rod against such longitudinal movement as would bring the hand crank to its driving position.

12. In a motor plow, a support in engagement with the ground, a frame carrying plow shares and adjustable up and down relatively to said support, a device for adjusting said frame relatively to said support, stops connected with said support, means carried by said frame and adapted to be brought into engagement with said stops by the adjusting movement of the frame, and mechanism thrown into action by the engagement of said stops with said means, for throwing the said adjusting device out of action.

13. In a motor plow, a support in engagement with the ground, a frame carrying plow shares, and adjustable up and down relatively to said support, a plow motor, a device, adapted for operation by the power of the plow motor, for adjusting said frame relatively to said support, stops connected with said support, means carried by said frame and adapted to be brought into engagement with said stops by the adjusting movement of the frame, and mechanism thrown into action by the engagement of said stops with said means, for disconnecting said adjusting device from the plow motor.

14. In a motor plow, a support in engagement with the ground, a frame carrying plow shares and adjustable up and down relatively to said support, a plow motor, a device, adapted for operation by the power of the plow motor, for adjusting said frame relatively to said support, manually-controlled means for operatively connecting said device with the plow motor, stops connected with said support, means carried by said frame and adapted to be brought into engagement with said stops by the adjusting movement of the frame, and mechanism thrown into action by the engagement of said stops with said means, for disconnecting said adjusting device from the plow motor.

15. In a motor plow, a support in engagement with the ground, a frame carrying plow shares and adjustable up and down relatively to said support, a plow motor, a device for adjusting said frame relatively to said support, means for operating said device by manual power, means for operating said device by the power of the plow motor, and a device for preventing the use of said manually-operated means while the motor power is connected with said adjusting device.

16. In a motor plow, a support in engagement with the ground, a frame carrying plow shares and adjustable up and down relatively to said support, a plow motor, a device for adjusting said frame relatively to said support, and power-transmitting means, under the control of the operator, and additional to the propelling mechanism of the plow, for applying the power of the plow motor to said adjusting device, whereby said frame may be adjusted vertically by the power of the motor while the plow, including the said support, is being propelled by the power of the motor.

17. In a motor plow, two members one of which carries a steering wheel while the other carries plow shares and is adjustable up and down relatively to the first-named member, a device for adjusting the member carrying plow shares, relatively to the other member, stops connected with one of said members, and mechanism, comprising an actuating portion adapted to engage said stops and carried by the other member, for automatically throwing the said adjusting device out of action.

18. In a motor plow, two members one of which carries a steering wheel while the other carries plow shares and is adjustable up and down relatively to the first-named member, a device for adjusting the member carrying ploy shares, relatively to the other member, stops connected with one of said members, mechanism, comprising an actuating portion adapted to engage said stops and carried by the other member, for automatically throwing said adjusting device out of action, and manually-actuated means for throwing said device into action.

19. In a motor plow, two members one of which carries a steering wheel while the other carries plow shares and is adjustable up and down relatively to the first-named member, a device for adjusting the member carrying plow shares, relatively to the other member, stops connected with one of said members and adjustable relatively thereto to different levels, and mechanism, comprising an actuating portion adapted to engage said stops and carried by the other member, for throwing said adjusting device out of action automatically.

20. In a motor plow, a member in supporting engagement with the ground, another member carrying plow shares and adjustable up and down relatively to the first-named member, a device for adjusting the member carrying plow shares, relatively to the other member, stops connected with one of said members, and mechanism, comprising an actuating portion adapted to engage said stops and carried by the other member, for throwing said adjusting device out of action automatically.

21. In a motor plow, a member in supporting engagement with the ground, another member carrying plow shares and adjustable up and down relatively to the first-named member, a plow motor, a device, adapted for operation by the power of the plow motor, for adjusting the member carrying plow shares, relatively to the other member, stops connected with one of said members, and mechanism, comprising an actuating portion adapted to engage said stops and carried by the other member, for automatically disconnecting said adjusting device from the plow motor.

22. In a motor plow, a member in supporting engagement with the ground, another member carrying plow shares and adjustable up and down relatively to the first-named member, a plow motor, a device, adapted for operation by the power of the plow motor, for adjusting the member carrying plow shares, relatively to the other member, manually-controlled means for operatively connecting said device with the plow motor, stops connected with one of said members, and mechanism, comprising an actuating portion adapted to engage said stops and carried by the other member, for automatically disconnecting said adjusting device from the plow motor.

23. In a vehicle, the combination of a support adapted to engage the ground, a frame movable up and down relatively to said support, an adjusting device for raising or lowering said frame relatively to said support, a motor, a connection between the motor and said adjusting device, a movable member controlling said connection, a hand crank movable into and out of driving relation to said adjusting device, and a locking mechanism comprising operatively connected members one of which is adapted to prevent the hand crank from being moved into its active position when said movable controlling member is in its active position, while the other member of the locking mechanism is adapted to hold said controlling member in its releasing or neutral position at the time the hand crank is free to be moved to its driving position.

In testimony whereof I have signed this specification in the presence of two subscribing witnesses.

CARL GLEICHE.

Witnesses:
 HERMANN SCRIM,
 FRANZ KORNMÜLLER.